United States Patent [11] 3,545,562

[72] Inventor William J. Gundlach
 Fulshear, Texas
[21] Appl. No. 876,189
[22] Filed Nov. 28, 1969
 Continuation of Ser. No. 766,412, Oct. 10, 1968, abandoned
[45] Patented Dec. 8, 1970
[73] Assignee Geo Space Corproation
 Houston, Texas
 a corporation of Texas

[54] GAS EXPLODER SYSTEM
 8 Claims, 4 Drawing Figs.
[52] U.S. Cl. .................................................... 181/0.5
[51] Int. Cl. ..................................................... G01v 1/04
[50] Field of Search .......................................... 181/0.5(1C)

[56] References Cited
UNITED STATES PATENTS
| | | | |
|---|---|---|---|
| 1,899,970 | 3/1933 | McCollum.................... | 340/15.5 |
| 2,994,397 | 8/1961 | Huckabay..................... | 181/0.5 |
| 3,058,540 | 10/1962 | Simpson....................... | 181/0.5 |
| 3,256,952 | 6/1966 | Crider et al................... | 181/0.5 |

Primary Examiner—Rodney D. Bennett, Jr.
Assistant Examiner—Daniel C. Kaufman

ABSTRACT: This invention relates generally to gas exploders including a combustion chamber, for receiving a mixture of combustible gases, and a flexible conduit coupled to the chamber and adapted for carrying a detonating shock wave into the combustion chamber, thereby igniting the gases in the combustion chamber, and/or carrying a uniformly mixed gas mixture into the combustion chamber.

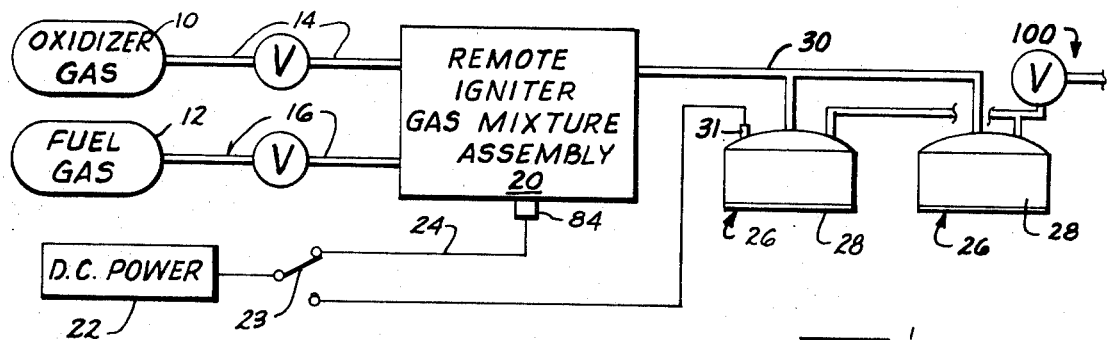
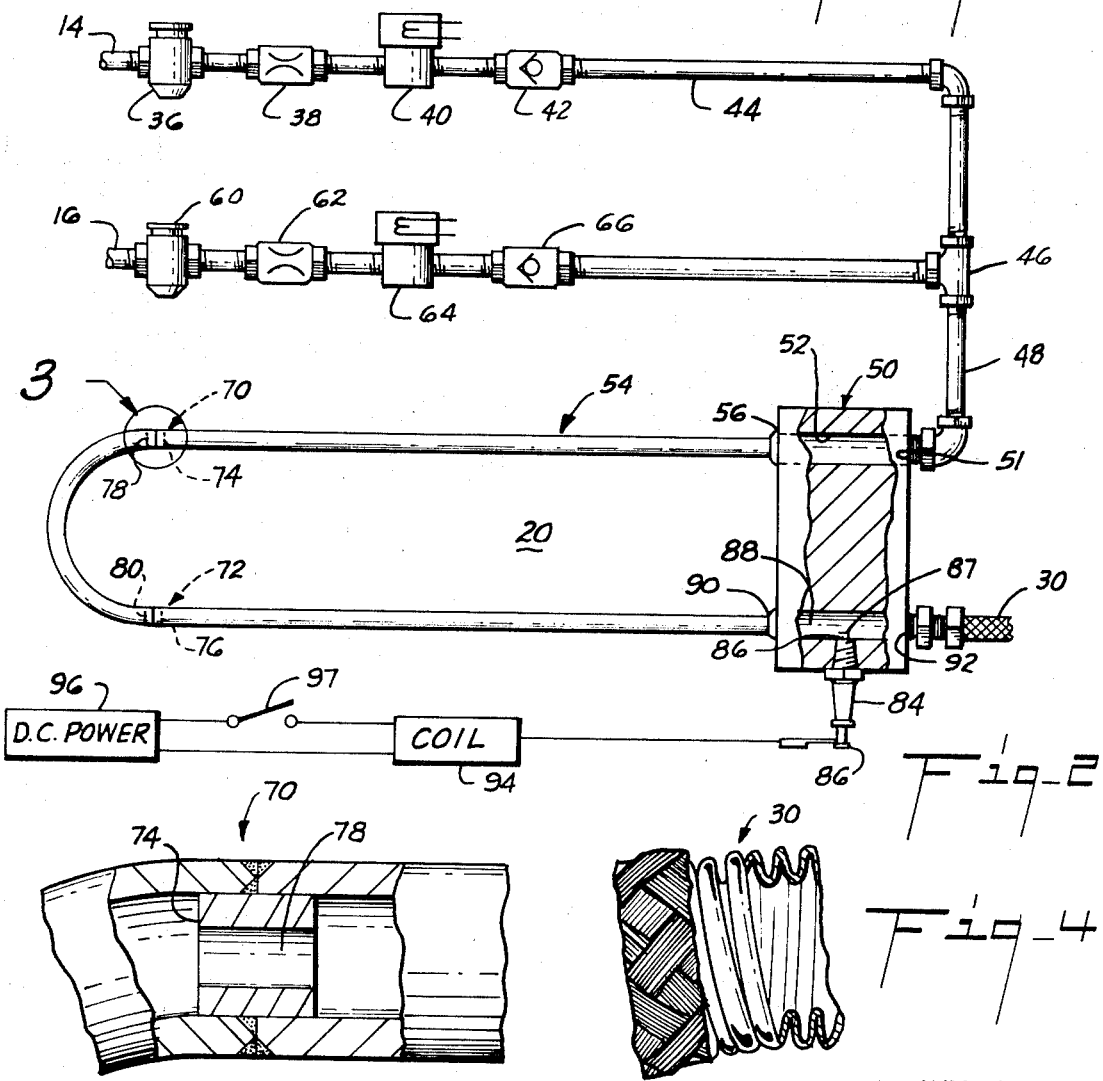

GAS EXPLODER SYSTEM

This is a continuation of application Ser. No. 766,412, filed Oct. 10, 1968 and now abandoned.

BACKGROUND OF THE INVENTION

Gas exploders are used in many technical fields such as in seismic exploration, metal forming, pile driving, etc. The proper operation of a gas exploder is dependent upon the existence in the combustion chamber of a uniform, suitably proportioned mixture of fuel and oxidizer gases. Even when the fuel and oxidizer gases are admitted to the combustion chamber at the proper ratio, in the combustion chamber the gas mixture is not always consistently uniform. For example, there may be small areas or pockets particularly at edges and corners in the chamber wherein the mixture is nonuniform. When the gases in the combustion chamber become ignited, the detonation in such pockets is either at some undesired velocity or practically nonexistent. Consequently, a part of the charge of fuel and oxidizer gases may be wasted, or what is worse, a relatively weak detonation results from the entire charge. In the geophysical exploration field, for example, faulty or relatively weak detonations cause inferior records.

While this invention is particularly well suited to arts other than the seismic art, it will hereinafter be described with particular reference to gas exploders used in the seismic prospecting art. It should be understood, however, that the invention will find important applications in other fields, as previously mentioned.

Typically in seismic prospecting, pulses of acoustic energy are sequentially generated in the area under investigation. The downwardly directed acoustic waves give rise to reflected and/or refracted waves at the formation interfaces encountered in the downward path of travel by the transmitted waves. Sensitive transducers such as geophones or hydrophones are suitably emplaced for transforming the returned acoustic waves into corresponding electric signals which are applied to suitable recording and displaying apparatus.

Generally known seismic gas exploders include an enclosed or open ended combustion chamber containing an igniter, typically a spark plug, inlet tubes for admitting fuel and oxidizer gases, and often exhaust tubes to allow the products of combustion to escape to the atmosphere.

While the use of seismic gas exploders has increased significantly in the last few years, certain problems have been encountered in their use.

The improper, partial or incomplete mixing of the fuel and oxidizer gases in the combustion chamber cause the gas exploder to misfire or the mixed gases to burn rather than to detonate, or to detonate but with a relatively low order of energy yield.

Generally in known gas exploders, the mixing of fuel and oxidizer gases was done in the combustion chamber itself. The spark plug or igniter formed a part of or was mounted on the gas exploder. The dimensions of a typical seismic gas exploder are relatively large compared to the dimensions of the inlet fuel and oxidizer lines. Therefore, poor gas mixing frequently occurred in the combustion chamber, giving rise occasionally to low energy detonations.

Known seismic gas exploders also suffer from field servicing problems. It will be appreciated that when the igniter or spark plug and inlet valves are mounted in or on the exploder, their servicing and maintenance in the field are rather difficult, particularly in the case where the gas exploders are used in subzero weather or under water.

Also in marine seismic work, the gas inlet lines present an objectionable drag and even cause undesirable noise.

SUMMARY OF THE INVENTION

The gas exploder system of the present invention eliminates the foregoing and other problems by providing through a flexible conduit thoroughly mixed fuel and oxidizer gases to the inner volume of the combustion chamber. The gas mixer is positioned a distance from the combustion chamber as on board ship or near the cabin of the vehicle carrying the gas exploder. The detonation in the combustion chamber may be initiated by sending a detonation shock wave through the flexible conduit into the combustion chamber or the detonation may be initiated by a spark plug mounted on the exploder in a conventional manner. The flexible conduit may be several feet long or even a 100 and more feet long. Also, several gas exploders may be fired from the same or independent igniters simultaneously or in a predetermined time pattern by taking into consideration the travel time of the detonation shock waves through the flexible conduits.

Accordingly, it is a main object of the present invention to provide through a flexible conduit the combustion chambers in gas exploders with mixtures of thoroughly mixed gases from a remotely positioned gas supply source.

It is another object of the present invention to use the same flexible conduit both for carrying detonation shock waves and the thoroughly mixed gases into the combustion chambers.

It is yet another object of this invention to provide a single assembly adapted to be mounted remotely from the gas exploder and connected thereto by a flexible tube, the assembly having means for thoroughly mixing the fuel and oxidizer gases and igniting the mixed gases to thereby set up detonation shock waves through the flexible tube.

A still further object of the present invention is to allow the construction of gas exploders which are relatively inexpensive to manufacture, easy to maintain in good repair, and adapted for use under severe environmental conditions and under water.

Yet another important object of the present invention is to provide a gas exploder system including a combustion chamber, a remotely positioned fueling assembly including a gas mixer and igniter, and a flexible tube coupling the assembly to the chamber thereby allowing relative displacement between the assembly and the combustion chamber.

Other objects and advantages of the present invention will become apparent from the following detailed description when considered in conjunction with the accompanying drawings in which:

BRIEF DESCRIPTION OF THE DRAWINGS

FIG. 1 is a block diagram of the gas exploder system in accordance with the invention;

FIG. 2 is a showing, partly schematically and partly in cross section, of a preferred embodiment of the system shown in FIG. 1;

FIG. 3 is a view in cross section of a section of the gas mixer shown in FIG. 2; and FIG. 4 is a view in cross section of a portion of the flexible tube shown in FIG. 2.

Referring now to the drawings, and more particularly to FIG. 1, a source of oxidizer gas typically a container 10 of oxygen, a source 12 of fuel gas such as a tank of propane or the like, are connected through suitable tubings 14 and 16, respectively, to an assembly, generally designated as 20. Also connected to the assembly 20 is a suitable electric energy source such as a battery 22 through a switch 23 and a conductor 24. A gas exploder 26 having an inner volume forming a combustion chamber 28 is coupled to the assembly 20 through a flexible conduit or tube 30, the length of which may vary from a few feet to up to 100 and more feet. The battery 22 may also be connected through switch 23 to a spark plug 31 on exploder 26 when local rather than remote and "flexible" firing is desired. Since the local firing technique is conventional no further description thereof is necessary.

As previously mentioned, the gas exploder 26 may be used in various fields such as metal forming, pile driving, and seismic exploration. In each field the exploder has a particular configuration. Since the invention does not reside in the gas exploder per se, no detailed description thereof is believed to be necessary.

In the seismic art several gas exploders are widely known under various trade names such as DINOSEIS and AQUAPULSE. These gas exploders are described in the technical and patent literature.

Seismic gas exploders are typically carried if for land work on special purpose off-the-road carriers and if for marine work on seismic ships. It will be readily appreciated that in accordance with this invention the fuel sources 10, 12, the electric energy source 22, and the assembly 20 can all be carried on board the carrier or ship, thereby allowing relative movement between the gas exploder 26 and the assembly 20.

Referring to the preferred embodiment shown in FIG. 2, tube 14 is connected through a strainer 36, an orifice 38, a solenoid operated valve 40, a check valve 42, a pipe 44, a T-coupler 46, a pipe 48 to the inlet port 51 of an assembly block 50. A suitable opening 52 through the block 50 allows the gases to enter a gas mixer or turbulator assembly 54 through outlet port 56.

The other line 16 feeds into the T-coupler 46, also through a strainer 60, an orifice 62, a solenoid operated valve 64, and a check valve 66. The strainers prevent the collection of foreign matter in the gas flow proportioning orifices 38, 62. These orifices have suitable relative throat sizes, which may be adjusted if desired, to provide a predetermined detonating gas mixture into the turbulator 54. The solenoid operated valves 40, 64 have suitable pressure and transmission capabilities. The check valves 42, 66 may be of the spring-loaded type capable of withstanding the peak back pressures of the detonating shock waves, thereby preventing damage to the relatively fragile, low-pressure solenoid valves 40, 64. since these components are commercially available and their respective functions are well known, no further description thereof is believed necessary for an understanding of this invention.

The main function of the turbulator assembly 54 is to allow thorough mixing of the fuel and oxidizer gases from sources 10, 12. A suitable turbulator can be made of inexpensive tubing, for example in U-shaped form. Two constrictions 70, 72 are provided as shown. The constrictions 70, 72 are arranged by inserting two tubular inserts 74, 76, respectively, having orifices 78, 80 of reduced diameters. Experimentally the diameters 78, 80 are determined for optimum turbulance and hence mixing of the incoming gases.

For remote firing any desired igniter or igniter system may be employed. For simplicity a spark plug 84 is shown mounted at the bottom of the assembly mounting block 50. The electrodes 86, 87 of the spark plug 84 are exposed to an internal channel 88 coupling an inlet port 90 to an outlet port 92 which is connected to the flexible tube 30. The turbulator is therefore coupled between ports 56 and 90. Connected to the center electrode 86 is a suitable ignition coil 94 energized by an electrical source 96 through a switch 97. The spark plug, ignition coil and switch may be of the same types as those used in the automobile industry since they are generally available and are relatively inexpensive.

In FIG. 4 is shown a section of a commercially available flexible tube made by Flexonics, known in the trade as corrugated metal hose Series 400 S/S. As can be seen from the drawing, the flexible pipe 30 has a bellows type construction and is fabricated from stainless steel with close pitch annular corrugations. The hose has a maximum working pressure range specified by the manufacturer from full vacuum to 4,500 p.s.i.g. depending on size. It can withstand temperatures up to 1,500° F. Other flexible hoses could be employed and for some applications plastic hoses made for example of Teflon could also be used.

In operation, the seismic sound source 26 is placed in position to fire either on land or under water, the oxidizer and fuel supply sources 10, 12 are turned on and their pressures adjusted to about the same value. The operating pressure is of course determined by the fuel supply system characteristics such as tubing size, valve port areas, etc., by the fuel volume requirements of the seismic sound source itself, and by the time available for filling the combustion chamber between successive explosions. These factors are usually known and are taken into consideration in the design of the fuel supply system.

With fuel and oxidizer pressures established, the solenoid valves 40, 64 are opened, permitting fuel and oxidizer to flow through the check valves 42, 66, respectively, and through the T-coupling 46, line 48, opening 52 in the mounting block 50, and into the turbulator assembly 54. In the turbulator assembly the restrictions 70 and 72 cause the gases to become thoroughly mixed. This mixture is fed through the opening 88 into the flexible tube 30. The thoroughly mixed gases are thus admitted into the gas exploder 26 through the flexible tube 30. Valves 40 and 64 are held open until the combustion chamber 28 inside the exploder 26 is fully filled at which time the valves are closed and the mixture ignited by momentarily closing and opening switch 97.

Upon becoming ignited at the electrodes of the spark plug 84, a detonation shock wave is formed and moved through the flexible tube 30 into the gas exploder 26 where it detonates the mixture of fuel and oxidizer charge in the combustion chamber 28. The resulting detonation generates an acoustic wave useful for obtaining seismic reflection and/or refraction waves.

The detonation shock wave also moves in the direction opposite from the compliant tube 30 and proceeds backward through the turbulator 54 and the connecting fuel supply line system until it reaches check valves 42, 66. The check valves 42, 66 which are normally closed, protect the relatively low-pressure solenoid operated valves 40, 64 and the remaining of the supply fuel line system connected thereto.

After the charge in the seismic gas exploder 26 is detonated and the products of combustion exhausted through the exhaust system, generally designated as 100 (FIG. 1), the solenoid valves 40, 64 may be reopened to supply a fresh charge of thoroughly mixed gases into the seismic gas exploder 26 for the next cycle of operation.

It will be readily appreciated that the foregoing described preferred embodiment is simple to construct and relatively easy to service. The turbulator assembly 54, through its restrictions 74, 76 and the connecting tubing, allows thorough mixing of the fuel and oxidizer gases. The gas supply lines, remote igniter, and gas mixer assembly 20 can be mounted on board ship or near the cabin of the special purpose carrier where they can be relatively easily inspected and serviced. Other advantages of the system will be readily apparent to users of gas exploders. For example, in marine seismic exploration it is desired to have a minimum of lines coupling the marine seismic energy source to the seismic ship to prevent drag and the generation of undesirable noise. By adapting the system of the present invention both drag and noise are reduced considerably.

Several gas exploders can be connected in series and/or series parallel combinations and supplied from a single igniter and mixer assembly 20 (See FIG. 1).

Therefore, while preferred embodiments have been disclosed, it will be understood by those skilled in the art that modifications may be made therein without departing from the principles of the present invention, and said invention is to be limited only by the claims appended hereto.

I claim:

1. A seismic gas exploder system comprising:
   a combustion chamber;
   gas supply means;
   at least one flexible conduit coupling said gas supply means to said chamber;
   said conduit defining a combustible gas mixture flow path extending to said chamber;
   gas igniter means remotely positioned in one portion of said path upstream of said conduit;
   said conduit permitting, during operation of said system, relative displacement between said chamber and said igniter means; and said conduit first supplying a combustible gas mixture to said chamber and subsequently supplying to said chamber a detonation shock wave set up by said igniter means.

2. The system of claim 1 wherein said one portion of said path further includes a gas mixer for mixing supplies of fuel gas and oxidizer gas.

3. The system of claim 2 wherein said mixer has a generally U-shaped flow path containing at least one constriction.

4. The system of claim 3 and further including an assembly block for supporting said gas mixer and said igniter means.

5. The system of claim 4 wherein said igniter means is a spark plug.

6. The system of claim 4 and further including check valve means positioned upstream of said igniter means.

7. The system of claim 6 and further including controllable valve means positioned upstream of said check valve means.

8. The system of claim 7 wherein said gas supply means includes a supply of at least one fuel gas and of at least one oxidizer gas connected to feed said flow path.